United States Patent [19]

Mitchell, Jr.

[11] 3,986,124

[45] Oct. 12, 1976

[54] COMBINER FOR DIVERSITY RECEIVING SYSTEMS

[75] Inventor: Joseph H. Mitchell, Jr., Washington, D.C.

[73] Assignee: Page Communications Engineers, Inc., Vienna, Va.

[22] Filed: Dec. 1, 1964

[21] Appl. No.: 415,135

[52] U.S. Cl. .............................................. 325/305
[51] Int. Cl.² .......................................... H04B 1/06
[58] Field of Search .................... 325/305, 301, 306

[56] References Cited
UNITED STATES PATENTS

| | | | |
|---|---|---|---|
| 2,835,799 | 5/1958 | Day | 325/305 |
| 2,947,861 | 8/1960 | Ulstad et al. | 325/305 |
| 3,296,532 | 1/1967 | Robinson | 325/305 |
| 3,305,781 | 2/1967 | Robinson | 325/305 |

*Primary Examiner*—John C. Martin
*Attorney, Agent, or Firm*—Edward E. Dyson; John J. Byrne

[57] ABSTRACT

A diversity combiner for RF signal receiving systems of the type in which a plurality of identical or substantially identical receivers each obtains an input signal from a different antenna location in response to receipt of a common RF wave and provides an audio output signal derived from the input signal and further provides a DC control signal related to noise characteristics on the incoming signal. The combiner includes a plurality of transistorized differential amplifier channels, and a plurality of transistorized summing amplifier channels connected respectively to the differential amplifier channels. The DC control signals from the various receivers are applied respectively to the differential amplifier channels, which in turn control the conductivity of the summing amplifier channels and the extent to which respective audio signals from the receivers applied to the latter channels are passed by those channels for combination into a single output signal.

18 Claims, 3 Drawing Figures

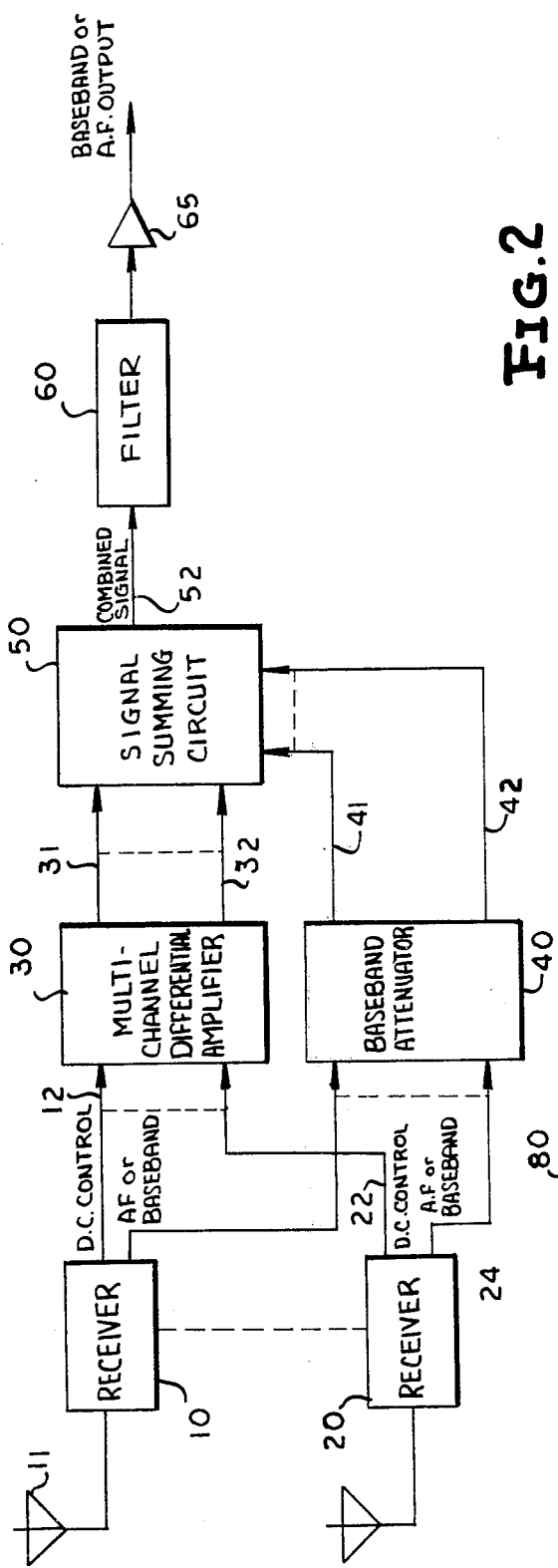
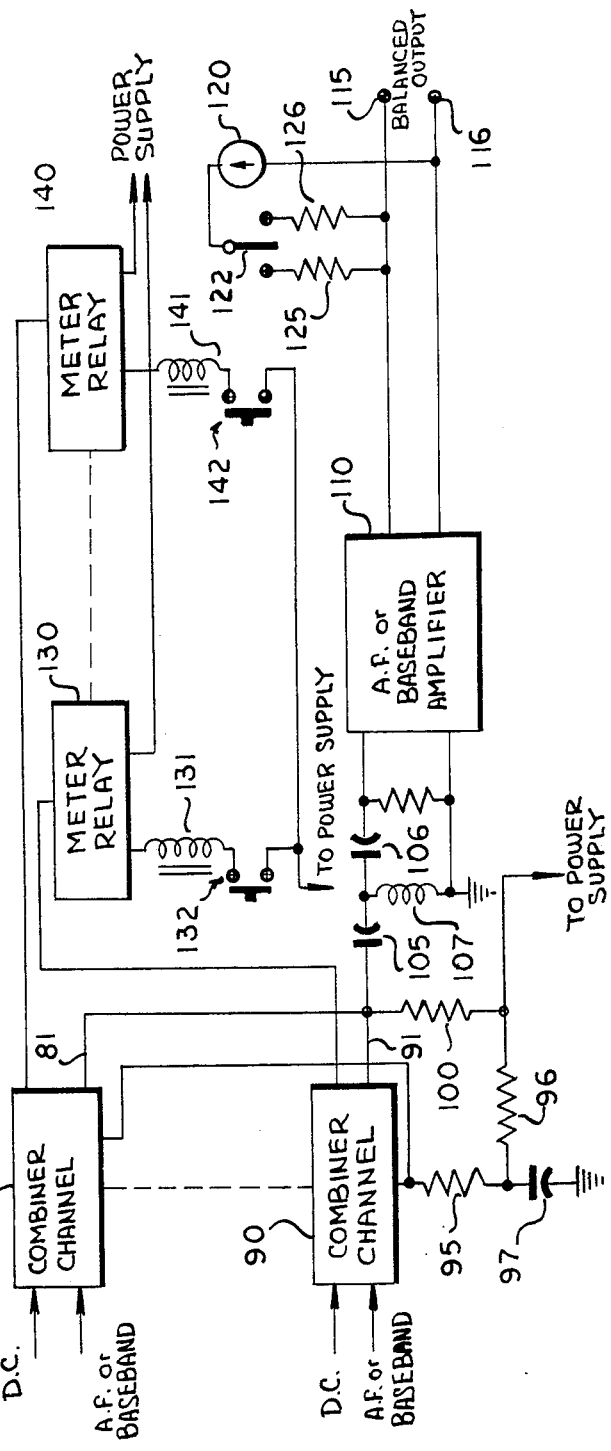

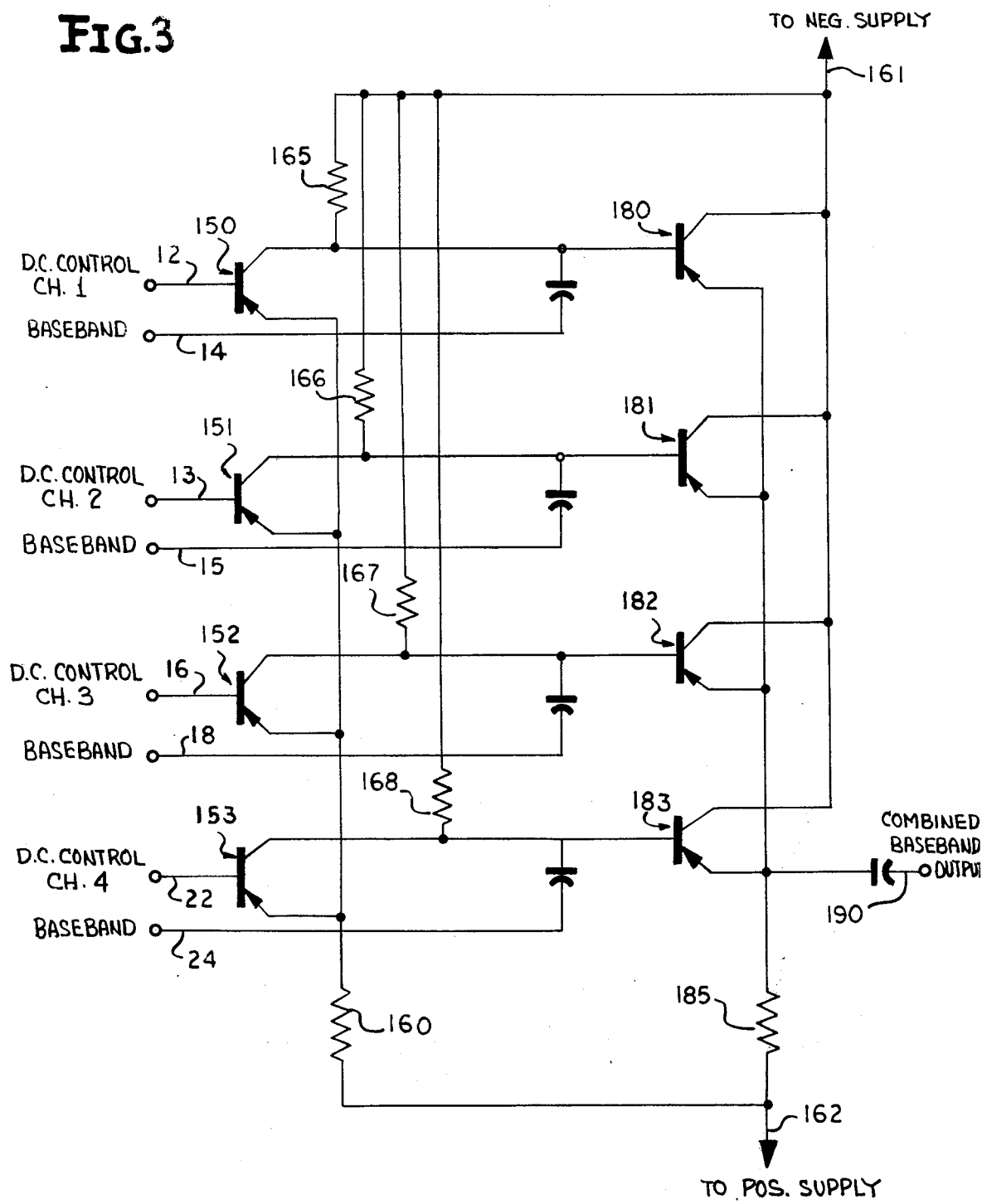

COMBINER FOR DIVERSITY RECEIVING SYSTEMS

The present invention relates generally to diversity arrangements for RF reception systems, and more particularly, to combining circuits for use with such systems.

In radio frequency (RF) communication systems, it is often difficult to obtain desirable or sufficient signal intensity at the receiver because of signal fading, which may be caused, for example, by the effect of atmospheric conditions or by ever-present changes in the ionospheric layers. To some extent, automatic gain control (AGC) in AM receivers will provide an increase in receiver gain sufficient to permit reception during periods of signal fading, but this advantageous performance is achieved at the expense of a corresponding increase in noise level. As signal-to-noise ratio (S/N) decreases during severe fading, the AGC system merely produces a noise level approaching the desired signal intensity and thus fails to provide an adequate solution to the problem.

Similarly, the use in FM receivers of limiters and/or ratio detectors provides, at least to a degree, some suppression of noise at the receiver output, but such performance is also severely reduced as the signal level approaches noise level during periods of signal fading.

For these reasons, it has been desirable to employ various types of diversity control systems in conjunction with RF reception apparatus to reduce the undesirable effects of signal fading. Such systems generally employ a plurality of receivers, each provided with a separate antenna, the antennas being spaced from each other by several wavelengths of the frequency range of interest, or in accordance with related heights, in a known manner. Such multiple antenna-receiver combinations provide a suitable signal for at least one receiver for a much larger percentage of time than may be realized using a single antenna and receiver, by virtue of the fact that the signals received at more than one location do not, as a rule, fade together. The received signals are fed through several channels coupled to the respective receiver outputs and are subsequently combined to provide a common audio or baseband output signal at a diversity combiner. Typically, the diversity combiner includes an electromechanical or electronic switching arrangement controlled by the receiver signal levels and operating in such manner as to provide a final output signal which is essentially that of the receiver having the best signal-to-noise ratio. Thus, during periods of signal fading, the principal or sole contribution to the combined audio output signal is obtained by crossover switching to the channel which has, at a given instant of time, the highest signal-to-noise ratio. Diversity control system arrangements therefore insure that a signal is received the great majority of the time by switching from one receiver to another in accordance with decreases in signal intensity at each antenna.

Prior art diversity combiners have not, however, heretofore provided a complete solution to the signal fading problem and the effects thereof on RF reception. In addition to complexity, the previous systems have had disadvantages such as fluctuations in audio or baseband output level, switching transients, and reduction in signal-to-noise ratio at crossover from channel to channel.

In accordance with the present invention, the diversity system is provided with a multi-channel combiner circuit, including a differential amplifier, to which is applied separate control voltages derived from each receiver. The differential amplifier, in turn, controls the dominance of amplification by an active summing circuit to permit passage of the audio signal from the receiver having the highest signal-to-noise ratio, while suppressing the output signals of the other channels in proportion to their signal-to-noise ratios. The combined audio output signal thus has as the principal or sole contribution the best received signal, the output signal from the combiner network undergoing a constant-amplitude transition during fading from channel to channel.

Accordingly, it is a principal object of the present invention to provide an improved diversity system for minimizing the effects of signal fading in RF reception systems.

It is a further object of the present invention to provide an improved diversity system for FM receivers.

It is a more specific object of the present invention to provide a diversity combiner which undergoes a smooth transition from channel to channel in accordance with the variations in signal-to-noise ratio of each channel resulting from signal fading.

It is a still further object of the present invention to provide a combiner circuit, for a plurality of transmission paths, providing an output signal which is dominated by the signal obtained from the path having the highest signal intensity over ambient noise.

Another object is to provide a diversity combiner which optimizes the combination of two or more signals in such a way that the combined output signal to noise ratio is always greater than any of the input signals.

Another object of the present invention is to provide a diversity combiner for FM receivers which produces substantially uniform audio level, smooth transition from channel to channel, and uniform signal-to-noise ratio, in the combined audio output in the cross-over regions.

It is a further object of the present invention to provide a combiner network which has simplicity of configuration, wide dynamic range, and high sensitivity and stability.

An additional object is to provide a diversity combiner of reduced circuit complexity.

Further objects, features, and attendant advantages of the present invention will become apparent from a consideration of the following detailed description of specific embodiments thereof, especially when taken in conjunction with the accompanying drawings in which:

FIG. 1 is a block diagrammatic view of an overall diversity system in accordance with the present invention;

FIG. 2 is a more detailed view, partially in block diagrammatic and partially in schematic form, of the combiner portion of the circuit of FIG. 1; and FIG. 3 is a schematic diagram of a diversity combiner in accordance with the present invention.

Referring now generally to the drawings, and more particularly to FIG. 1, an FM receiver 10 is coupled to an antenna 11 to provide an audio frequency output signal to path 14 and a DC control signal to path 12. The specific circuitry within the FM receiver 10 is not critical, and may be of any conventional design. A plurality of such receivers and associated antennas may be provided to supply the outputs for the several channels of the diversity system in a known manner. Such a plurality of components and signal paths is indicated in the several figures by dotted lines between corresponding elements. Thus, N inputs to N channels will be provided by N receivers having input and output couplings as are depicted with reference to receivers 10 and 20. The antennas coupled to each receiver are spaced in accordance with known principles of space diversity, such that a high probability of adequate signal intensity exists for at least one of the receivers during any given instant of time.

The DC control voltages provided at receiver output paths 12 and 22 may be obtained, for example, from each FM receiver by means of an out-of-band noise amplifier and detector, and are applied to a multichannel differential amplifier 30. The latter in turn provides control signals at 31 and 32 to an active signal summing circuit 50. The baseband frequency outputs of the receivers, at signal paths 14 and 24, for example, are also applied to summing circuit 50, as at 41 and 42, through an attenuator 40, if desired, to permit summing unit operation for a plurality of receiver audio output levels. The summing circuit operation produces a combined signal at a single output 52. The principal contribution to the combined signal output of summing circuit 50 is provided by the receiver output having the highest signal-to-noise ratio, as will be explained, by virtue of the controlling operation of multichannel differential amplifier 30. The combined signal may then be fed through suitable filters, such as 60, and baseband amplifier, such as 65, for application to an appropriate utilization device (not shown).

Certain aspects of the operation of portions of the circuit illustrated in FIG. 1 will be more clearly understood by reference to FIG. 2. A plurality of N combiner channels, such as 80 through 90, are supplied with DC and AF signals from their respective receivers. Each combiner channel includes a portion of the differential amplifier circuit and a stage of the summing circuit. The output of the several combiner channels is obtained from a common load, such as resistor 100, which is connected to the combiner outputs by conductors 81 through 91. This signal may then be applied to an appropriate filter circuit such as the illustrated LC T-section high-pass filter consisting of series capacitors 105 and 106 and shunt inductor 107. The filtered signal may be amplified by baseband amplifier 110 to provide a balanced output signal at terminals 115 and 116. A meter 120 may also be conveniently coupled across the amplifier output and associated with appropriate attenuating resistors 125 and 126, and switch 122, to provide an indication of baseband signal level at that point, if desired.

A fail-safe arrangement is provided by meter relays 130 through 140, for example, associated respectively with the combiner channels, to prevent the disabling of the combiner by a defective channel or channels. To this end, the relays are provided to monitor operational current in each combiner channel, such that should channel current fall outside the particular limit settings of the relays, the defective channel is automatically muted to prevent it from capturing the combiner, or from being non-contributing for more than a matter of a few seconds. Each relay is provided with a reset button, as 132 to 142, to reconnect power to the faulty channel after the fault has been corrected.

One embodiment of a transistorized differential amplifier-combiner circuit, suitable for use with the diversity systems illustrated in FIGS. 1 and 2, is presented in FIG. 3. The circuit will be described with reference to a four-channel diversity system, but it will be understood that the operation to be described may be embodied in any number of channels. Thus, for example, certain stages of the four-channel combiner circuit may be removed, as by a convenient plug-in arrangement, to operate with triple or dual diversity receivers.

Referring now to FIG. 3, a plurality of PNP transistors 150, 151, 152 and 153 are coupled in a common emitter configuration through resistor 160 to a positive power supply (not shown). A DC control voltage is applied to the base lead of each of these transistors via conductors 12, 13, 16 and 22, respectively. The collector of each transistor is coupled to a negative supply (not shown) through suitable load resistors 165, 166, 167 and 168.

A second plurality of PNP transistors 180, 181, 182 and 183 are coupled, through their base leads, to the collectors of transistors 150 through 153, respectively. In addition, the audio frequency signals of each channel are applied to the base leads of transistors 180 to 183 via conducting leads 14, 15, 18 and 24 and suitable DC blocking capacitors.

It will be recognized that transistors 180 to 183 are coupled in emitter follower configuration, the emitter of each being paralleled through load resistor 185, from which the combined output signal is taken via lead 190. The collectors of the latter transistors are paralleled to a suitable source of power through conducting lead 161. It will, of course, be understood that NPN transistors may be used in place of PNP transistors with appropriate changes in the polarity of the signals applied and of the power supply voltages.

Transistors 150 to 153 and their associated load resistors operate as a multichannel differential amplifier exercising control over the conductive characteristics of transistors 180 through 183 by virtue of the DC control voltages applied from the several receivers. To this end, positive control voltages which are inversely proportional to out-of-band receiver noise may be obtained from the noise amplifiers in the FM receivers. An increasing positive control voltage is thus applied to the differential amplifier stage associated with that receiver having the best signal-to-noise ratio output at a given instant of time. That transistor will therefore be driven toward cut off as the positive control voltage at its base increases relative to the control voltages applied to the other differential amplifier stages.

Assume, for example, that the aforementioned condition obtains at transistor 151, i.e. in channel 2 of the diversity control system. As the DC control voltage at conductor 13 becomes more positive, transistor 151 will conduct less current and thus will provide at its output an increasingly negative voltage. This negative-going voltage appears at the base of transistor 181 in the summing portion of the combining circuit and will cause the latter transistor to conduct more heavily. Since the AF signal from channel 2 is also applied to transistor 181, that signal will supply the greatest contribution to the combined output signal obtained from common load resistor 185. The other channels, which are at this instant subjected to lower signal-to-noise ratios than that of channel 2, render their respective differential amplifier transistors 150, 152 and 153 in this case, relatively more conductive than transistor 151 since the DC control voltage at the base of each of these transistors is less positive, in varying proportions, than that appearing at the base of transistor 151. This operation causes summing transistors 180, 182 and 183 to pass proportionally lower AF signals from the channels to which they are coupled than that which is passed by transistor 181. In other words, the audio output signals from the receivers having the lower signal-to-noise ratios are suppressed, or may be cut off entirely if there is sufficient difference in signal-to-noise ratio between receivers.

On the other hand, should the channel 2 receiver be subjected to signal fading, another receiver will assume the dominant signal contribution as the DC control voltage supplied therefrom begins immediately to increase in a positive direction. The result of this operation is a smooth transition during fading from channel to channel, with substantially no change in amplitude of the combined output signal and no switching transients during crossover. It will thus be seen that combiner operation in the circuit of FIG. 3 is a function of the relative receiver input signal amplitudes or signal-to-noise ratios.

Of course, if two or more channels should have equal signal-to-noise ratios at any given instant of time, the signals derived therefrom would contribute equally to the combined output signal by virtue of the operation of the differential amplifier. That is, in such an event, the differential amplifier will regulate the conductivity of the summing amplifier transistors associated with those channels to provide equal signal levels therefrom, which are summed at the combined output.

Several advantages accrue from the use of the differential amplifier in conjunction with a summing amplifier over that operation which would result from applying both control and audio signals to the differential amplifier and deriving the combined output from a common load resistor. In the circuit arrangement in accordance with the present invention, differential amplifier operation is controlled solely by the DC signals which may be, for example, inversely proportional to channel noise level, or directly proportional to channel signal level, or proportional to the channel signal-to-noise ratio. Each of these signals is amplified to provide an output which emphasizes the relative difference in the transmission characteristics of the several channels. This output thus controls the conductivity of each summing amplifier stage to enhance the combined output signal and to provide greater sensitivity than would otherwise result. Moreover, the inherently degenerative nature of the summing amplifier obviates any abrupt transition in crossover which has characterized the prior art diversity combiner systems.

In addition to the advantages of such circuit operation which have previously been noted, the combiner circuit of the present invention has a greatly increased dynamic range, greater combining sensitivity with fewer stages of amplification, and improved gain stability because of the degenerative nature of the differential amplifier and emitter follower configuration, than have previously proposed and employed systems been able to attain.

While a particular embodiment of the present invention has been shown and described, it will be apparent that the various changes and modifications may be resorted to without departing from the true spirit and scope of the invention as defined in the appended claims.

I claim:

1. A diversity combiner for FM reception systems having a plurality of identical receivers each of which derives an input signal from a different antenna location and provides an audio output signal derived from said input signal and a DC control signal inversely proportional to input noise level, said combiner comprising multiple channel differential amplifier means, multiple channel summing amplifier means coupled to said differential amplifier means, and means for applying said audio signals to separate channels of said summing amplifier means, said differential amplifier means responsive to said DC control signals to control the conductivity of said summing amplifier means for passage of said audio signals therethrough in respective inverse proportion to said noise levels.

2. The combination according to claim 1 wherein said differential amplifier means includes a plurality of transistors each having base, emitter, and collector electrodes, said transistors coupled together in common emitter configuration, said DC control signals applied to said base electrodes, and wherein said summing amplifier means includes a further plurality of transistors each having base, emitter, and collector electrodes, said further transistors coupled together in emitter follower configuration, said base electrodes of said further transistors coupled to said collector electrodes of said first-named transistors, said audio signals applied to said base electrodes of said further transistors, the output signal of said emitter follower configuration being the summed combination of said proportionally passed audio signals.

3. Apparatus for combining a plurality of information-carrying signals each obtained from a separate transmission path and each having associated therewith a separate control signal representative of the signal transmission characteristics of said path, said apparatus comprising differential amplifier means having a plurality of inputs and outputs, summing amplifier means having a plurality of inputs and a single output, means coupling separate outputs of said differential amplifier means to separate inputs of said summing amplifier means, means for applying said information-carrying signals to separate inputs of said summing amplifier means, and means for applying said control signals to separate inputs of said differential amplifier means to regulate the passage of said information-carrying signals through said summing amplifier means in accordance with said transmission characteristics.

4. The combination according to claim 3 wherein said differential amplifier means includes a plurality of transistors each having base, emitter, and collector electrodes, said transistors coupled in common emitter configuration, said control signals being DC voltages applied to said base electrodes, said outputs taken from said collector electrodes, and wherein said summing amplifier means includes a further plurality of transistors each having base, emitter, and collector electrodes and coupled in emitter follower configuration, said single output taken from the coupled emitter electrodes thereof, said differential amplifier means having its output signal coupled to the base electrodes of said further transistors to control the conductivity of said summing amplifier means for said regulation of information-carrying signal passage.

5. A control device for regulating the domination of an output signal by input signals derived from a plurality of transmission channels, in accordance with control voltages representative of the signal-to-noise ratios of said channels, comprising amplifier means for additively combining said input signals, and differential amplifier means responsive to said control voltages for regulating the conductivity of said first-named amplifier means in proportion to said signal-to-noise ratios of said channels, whereby said first-named amplifier means inhibits the passage of input signals derived from the relatively higher noise level channels as the signal levels thereof decrease.

6. A combiner circuit for controlling the proportionate contributions of information-carrying signals received at a plurality of points to an output signal, as a function of noise associated with said information-carrying signals at said plurality of points, said circuit comprising a plurality of signal translation means of controllably variable conductivity each for preferentially passing a signal applied thereto in accordance with the respective degree of conductivity of its signal path, means for applying respective signals consisting essentially of the information-carrying signal received at each of said plurality of points to distinct and different ones of said signal translation means, means responsive to DC control signals developed from the respective noise levels associated with said information-carrying signal at said plurality of points for generating a plurality of further signals each having an amplitude determined in accordance with a function of the amplitude of each DC control signal to the total of the amplitudes of the DC control signals, means for applying each further signal to a different one of said signal translation means for controlling the degree of conductivity of the signal path of respective ones of said signal translation means, and means for combining the signals passed by said signal translation means as said output signal.

7. The invention according to claim 6 wherein said means for controlling the degree of conductivity of the signal path of respective ones of said signal translation means comprises a plurality of amplifiers each associated with a distinct and different one of said signal translation means, said amplifiers for amplifying said DC control signals to emphasize the relative difference in transmission characteristics at said plurality of points, and for applying the amplified control signals to said signal translation means as a bias to vary said degree of conductivity of the respective signal path.

8. A diversity combiner for developing an output signal constituting a combination of input signals representative of the same information-bearing signal derived from a plurality of different paths, as a function of at least one detectable signal transmission characteristic of the paths, said diversity combiner comprising a plurality of signal translation devices, each presenting to the passage of signal applied thereto an impedance that varies as a function of an applied bias signal; means for applying said input signals to different ones of said devices; means responsive to the detected signal transmission characteristic of each of said path for differentially generating respective bias signals therefrom and for applying each bias signal to a different one of said devices according to the respective path from which said input signal is obtained, to control the impedance of each of said devices, and thereby, the relative passage of said input signals therethrough; and means for additively combining the signals passed by said devices as relative contributions to said output signal.

9. A diversity combiner for FM reception systems having a plurality of identical receivers each of which derives an input signal from a different antenna location and provides an audio output signal derived from said input signal and a DC control signal as a function of a characteristic of the signals derived by said receiver, said combiner comprising multiple channel differential amplifier means, multiple channel summing amplifier means coupled to said differential amplifier means, and means for applying said audio signals to separate channels of said summing amplifier means, said differential amplifier means responsive to said DC control signals to control the conductivity of said summing amplifier means for passage of said audio signals therethrough as a function of the respective DC control signals.

10. The combination according to claim 9 wherein each said receiver derives a DC control signal as a function of the out-of-band noise of said input signal.

11. In combination, a plurality of variable impedance devices, means for permitting an input signal to be applied to each of said devices, means for combining each of said input signals coupled to said devices, and means for varying the impedance of each of these devices in accordance with the difference between a plurality of samples of noise free of input signal representing the amount of noise contained in each of said input signals to combine said input signals in optimum proportions.

12. A device for use as a diversity combiner including a plurality of solid state variable impedance devices, each of said devices having an impedance characteristic which varies with D.C. bias current, means for applying a separate input signal to each of these devices, each of said separate signals containing substantially the same information, and means for combating fading of said input signals by producing a single output signal from each of said input signals comprising means for varying the impedance presented to each of these input signals in accordance with biasing currents which are varied in response to a sample of noise representative of the noise power contained within each of the input signals.

13. A device for a communication system including a plurality of variable impedance devices, each of said devices having an impedance characteristic which varies with bias current, means for providing a biasing current to each of said devices, means for applying a different input signal containing substantially the same information content to each of said devices, each of said different signals representing a single signal which has traveled over a plurality of paths from a transmitting system, and each of these input signals containing an information band along with noise within the information band, and means for altering the biasing current provided to each of these devices in accordance with noise sampled out of the information band representative of the magnitude of the noise contained within the information band to combine each of these different input signals to provide a single output signal having an optimized signal-to-noise ratio.

14. A system for combining a plurality of input signals including a plurality of controllable impedance devices, means for providing a different one of a plurality of input signals to a different one of said plurality of controllable impedance devices, and means for controlling the impedance of each of these devices in accordance with the magnitude of the noise power present in each of these input signals to proportionally combine each of these input signals to provide a single output signal having a high signal-to-noise ratio.

15. A system comprising a plurality of impedance devices having an impedance characteristic which is altered with a change in bias current, means for permitting an input signal to be applied to each of said devices, and means for varying the impedance of each of these devices comprising means for altering the amount of bias current flowing through each of these devices in accordance with the amount of noise contained in each of these input signals to combine said input signals in optimum proportions.

16. In combination, a plurality of signal paths, means for sampling noise adjacent in frequency to a signal in each of said paths, means for providing a control signal from each noise sample, a nonlinear impedance device connected in each path, and means for applying one of said control signals to each device to alter its impedance as a function of the amount of noise sampled in each path.

17. A system comprising a plurality of channels, means for sampling noise adjacent in frequency to a signal in each of said channels, means for providing a control signal from each noise sample, a nonlinear impedance device connected in each channel, means for providing a bias current to each of said devices, and means for applying one of said control signals to each device to alter the amount of bias current provided to each device thereby effecting the device's impedance presented to a signal present in each of said channels.

18. A combiner comprising a plurality of variable impedance devices, each of said devices having an impedance characteristic which varies with D.C. bias current, means for permitting input signals to be applied to each of said devices, means for combining said input signals permitted to be applied to each of said devices, and means for varying the impedance of said devices comprising means for altering a biasing current flowing through each of said devices to combine said input signals.

* * * * *